(12) United States Patent
Zhang

(10) Patent No.: US 8,493,891 B2
(45) Date of Patent: Jul. 23, 2013

(54) METHOD, NETWORK ELEMENT, AND SYSTEM FOR COUNTING AUDIENCE OF MULTIMEDIA BROADCAST/MULTICAST SERVICE

(75) Inventor: Yupeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 13/035,431

(22) Filed: Feb. 25, 2011

(65) Prior Publication Data

US 2011/0149783 A1 Jun. 23, 2011

Related U.S. Application Data

(63) Continuation of application No. PCT/CN2009/070636, filed on Mar. 4, 2009.

(30) Foreign Application Priority Data

Aug. 26, 2008 (CN) .......................... 2008 1 0142178

(51) Int. Cl.
*H04L 12/28* (2006.01)
*H04L 12/56* (2006.01)
(52) U.S. Cl.
USPC ............ 370/255; 370/390; 370/432; 370/473
(58) Field of Classification Search
None
See application file for complete search history.

(56) References Cited

U.S. PATENT DOCUMENTS

| | | | | |
|---|---|---|---|---|
| 7,957,738 B2 * | 6/2011 | Rey et al. | ................... | 455/435.1 |
| 2006/0094408 A1 | 5/2006 | Hu et al. | | |
| 2006/0154627 A1 * | 7/2006 | Wang et al. | ................... | 455/130 |

FOREIGN PATENT DOCUMENTS

| | | | |
|---|---|---|---|
| CN | 1684468 | A | 10/2005 |
| CN | 1684469 | A | 10/2005 |
| CN | 1878178 | A | 12/2006 |
| CN | 101207788 | A | 6/2008 |
| EP | 1 624 610 | A1 | 2/2006 |
| WO | WO 2004/089030 | A1 | 10/2004 |
| WO | WO/2008/023792 | * | 2/2008 |
| WO | WO 2009/027529 | A1 | 3/2009 |

OTHER PUBLICATIONS

Partial Translation of Office Action dated Oct. 17, 2011 in connection with Chinese Patent Application No. 200810142178.4.
International Search Report issued May 14, 2009 in connection with International Patent Application No. PCT/CN2009/070636.
Partial Translation of Office Action dated Jul. 11, 2012 in connection with Chinese Patent Application No. 200810142178.4, 16 pages.
Partial Translation of Written Opinion of the International Searching Authority dated May 14, 2009 in connection with International Patent Application No. PCT/CN2009/070636.
Supplementary European Search Report dated Jul. 22, 2011 in connection with European Patent Application No. EP 09 80 9179.
"Audience measurement for MBMS in LTE", Alcatel-Lucent, 3GPP TSG RAN WG2 #57bis, Jan. 26-30, 2007, 4 pages.
"Example Signaling Procedure for Centric MBMS Architecture", Huawei, 3GPP TSG RAN WG3 Meeting #60, May 5-9, 2008, 6 pages.
Partial Translation of Office Action dated Mar. 5, 2013 in connection with Chinese Patent Application No. 200810142178.4.

* cited by examiner

*Primary Examiner* — Yemane Mesfin
*Assistant Examiner* — Christine Duong

(57) ABSTRACT

A method for counting the audience of multimedia broadcast/multicast service (MBMS) includes: by a first network element (NE), counting MBMS audience on the first NE; and reporting the MBMS audience counted on the first NE to a statistical analysis NE so that the statistical analysis NE gets an MBMS audience counting result. The invention also discloses a statistical analysis NE, a communication NE, and a system for counting MBMS audience. The invention overcomes the waste of resources on audience counting in multicast mode and provides a feasible method for counting audience in enhanced broadcast mode.

7 Claims, 7 Drawing Sheets

METHOD, NETWORK ELEMENT, AND SYSTEM FOR COUNTING AUDIENCE OF MULTIMEDIA BROADCAST/MULTICAST SERVICE

CROSS-REFERENCE TO RELATED APPLICATIONS

This application is a continuation of International Application No. PCT/CN2009/070636, filed on Mar. 4, 2009, which claims priority to Chinese Patent Application No. 200810142178.4, filed on Aug. 26, 2008, both of which are hereby incorporated by reference in their entireties.

TECHNICAL FIELD

The present invention relates to communication applications, and in particular, to a method, network element (NE), and system for counting the audience of multimedia broadcast/multicast service (MBMS).

BACKGROUND

For effective utilization of mobile network resources, the 3rd Generation Partnership Project (3GPP) proposes MBMS, a point-to-multipoint service that allows the delivery of data from one data source in a mobile network to multiple users. MBMS enables the sharing of network resources and increases the utilization of network resources, especially, air interface resources. The 3GPP-defined MBMS realizes the multicast and broadcast of not only low-rate text messages but also high-rate multimedia data.

For better allocation of MBMS user service resources and better service development such as the placement of programs and advertisements (ads) according to the MBMS audience size, it is necessary to count the audience of MBMS. Through researches, the inventor finds that in the prior MBMS model, broadcast and enhanced broadcast services do not support the counting of MBMS audience, but the counting of MBMS audience is supported in multicast mode, while the contexts of user equipments (UEs) must be stored in each NE in the network, which consumes too many network resources.

SUMMARY

Embodiments of the invention provide a method, device, and system for counting the audience of MBMS, an easy and effective method for counting the audience of MBMS, and a feasible method for counting the audience of MBMS in MBMS enhanced broadcast mode.

A method for counting the audience of MBMS includes:
counting, by a first NE, MBMS audience on the first NE; and
reporting the MBMS audience counted on the first NE to a statistical analysis NE so that the statistical analysis NE gets an MBMS audience counting result.

Accordingly, a communication NE includes:
a counting module, configured to count MBMS audience on the communication NE; and
a sending module, configured to report the MBMS audience counted by the counting module on the communication NE to a statistical analysis NE so that the statistical analysis NE gets an MBMS audience counting result.

Accordingly, a statistical analysis NE includes:
an obtaining module, configured to receive MBMS audience on at least one first NE reported by the at least one first NE; and a counting module, configured to receive the MBMS audience on the at least one first NE obtained by the obtaining module and collect statistics to get an MBMS audience counting result.

A method for counting the audience of MBMS includes:
obtaining, by a statistical analysis NE, MBMS audience on a first NE reported by the first NE; and
collecting statistics on the basis of the obtained MBMS audience on the first NE to get an MBMS audience counting result.

Accordingly, a system for counting the audience of MBMS includes:
a first NE, adapted obtain MBMS audience on the first NE; and
a statistical analysis NE, configured to receive the MBMS audience on the first NE reported by the first NE and collect statistics to get an MBMS audience counting result.

In the embodiments of the invention, lower-level NEs report the MBMS audience on the local NEs to the statistical analysis NE, so that the audience can be counted in multicast mode without requiring all NEs to store contexts of UEs. A feasible method for counting MBMS audience in MBMS enhanced broadcast mode is also provided.

BRIEF DESCRIPTION OF THE DRAWINGS

To make the technical solution under the present invention or in the prior art clearer, the accompanying drawings for illustrating the embodiments of the invention or illustrating the prior art are outlined below. Evidently, the accompanying drawings are exemplary only, and those skilled in the art can derive other drawings from such accompanying drawings without any creative effort.

DETAILED DESCRIPTION

Figure 1:
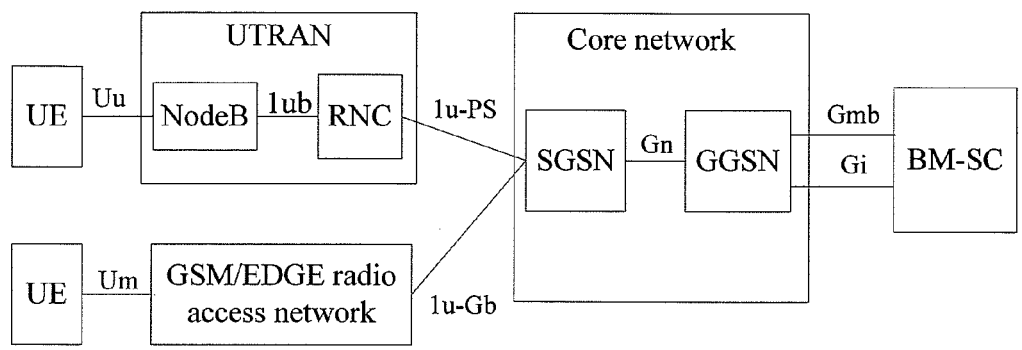
FIG. 1 illustrates an MBMS system architecture in a prior art.

FIG. 1 illustrates the MBMS system architecture in a wideband code division multiple access (WCDMA) or global system for mobile communications (GSM) network. The MBMS system may be based on different networks, including but not limited to the WCDMA/GSM packet network, and also including the time division-synchronous code division multiple access (TD-SCDMA) network. A broadcast multicast service center (BM-SC) is added in the network; existing packet domain functions including the serving GPRS support node (SGSN), gateway GPRS support node (GGSN), radio network controller (RNC) NodeB, and UEs are updated to support MBMS; a new logical shared channel is defined to realize the sharing of air interface resources. MBMS service interactions are thus implemented. FIG. 1 is a network reference model of MBMS. The edges of MBMS bearer services are Gmb and Gi reference points, which are the interfaces between BM-SC and GGSN. The Gmb reference point provides control plane functions and the Gi reference point provides user plane bearer functions.

MBMS is operated in three service modes: broadcast mode, multicast mode, and enhanced broadcast mode.

In broadcast mode, after a session begins, the RNC broadcasts on the common shared channels of all cells in its service area. Because the RNC does not exchange signaling with UEs, the RNC is unable to know whether a service is received by any UE in a cell or the quantity of UEs. Furthermore, the common shared channel is occupied throughout the broadcast session, which is a serious waste of air interface resources.

The multicast mode incorporates a counting/re-counting technique which determines the selected point-to-point (PTP) or point-to-multipoint (PTM) bearer according to the quantity of UEs served by an MBMS bearer service in the NodeB of a cell and performs PTP/PTM switching according to the change of UEs. When there is no UE, the service is not delivered. To support the multicast mode, however, a lot of signaling is added on the Uu, Iub, Iu, Gn, and Gmb reference points, and the RNC, SGSN, and BM-SC must all manage the MBMS service of the UEs and store the contexts of the UEs. After a UE selects a program, end-to-end signaling interactions must be carried out between the UE and the BM-SC before a bearer is set up.

In multicast mode, when a UE changes from one channel to another, all NEs between the UE and the BM-SC will exchange messages. The efficiency is very low, and in view of this, the MBMS enhanced broadcast mode is designed. The enhanced broadcast mode incorporates the counting/re-counting technique of multicast on the basis of broadcast, so that the signaling interaction between a UE and the network stops at the RNC. The SGSN, GGSN, and BM-SC do not know the state of the UE and do not store the context of the UE.

In MBMS multicast mode, during an MBMS process of a UE, the RNC, SGSN, GGSN, and BM-SC all store the context of the UE (including the UE ID and the MBMS service ID). Therefore, the MBMS audience will be known through simple counting in the BM-SC. The counting method requires that the context of the UE should be stored in all NEs and therefore consumes many network resources. In enhanced broadcast mode, the UE only interacts with the RNC in the network, and the SNSN, GGSN, and BM-SC do not know the state of the UE. Therefore, the MBMS audience cannot be counted.

Figure 2A:
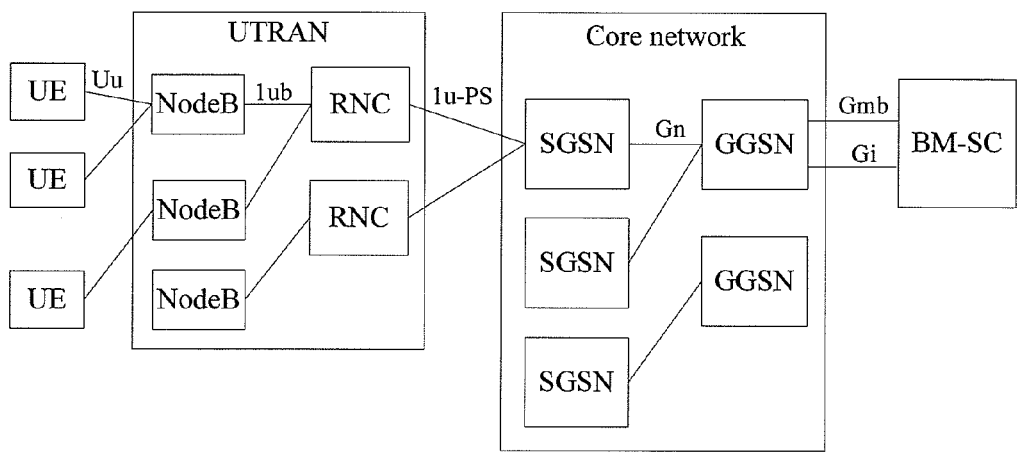
FIG. 2A illustrates a system architecture for counting MBMS audience according to an embodiment of the invention.
Figure 2B:
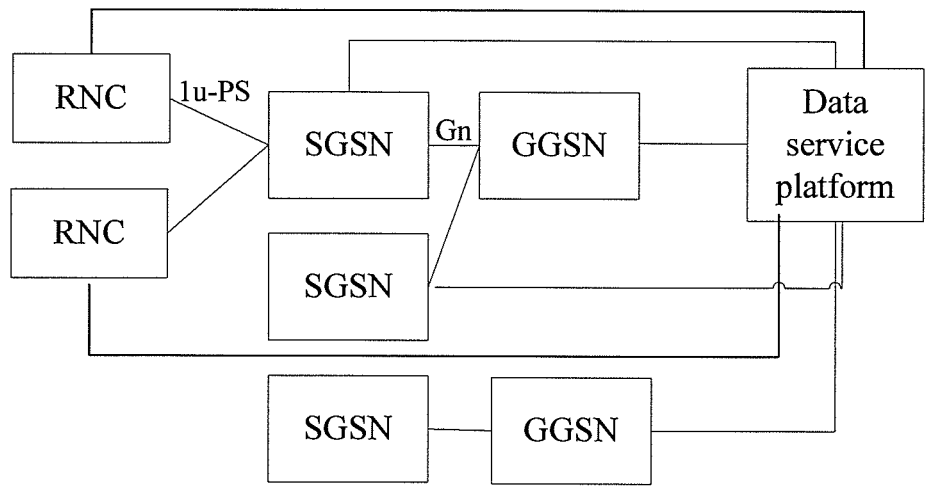
FIG. 2B illustrates a system architecture for counting MBMS audience according to an embodiment of the invention.

FIG. 2A and FIG. 2B illustrate the system architecture for counting MBMS audience according to embodiments of the invention.

In FIG. 2A, the BM-SC may act as a statistical analysis NE. An upper-level NE may correspond to multiple lower-level NEs. For example, one BM-SC corresponds to multiple core networks (CoreNets); one CoreNet corresponds to multiple Universal Mobile Telecommunications System (UNITS) terrestrial radio access networks (UTRANs); and one UTRAN corresponds to multiple UEs. One RNC corresponds to multiple NodeBs and one NodeB corresponds to multiple UEs. In the embodiment of the invention, an audience counting function is added on the RNC, SGSN, and GGSN, so that the RNC, SGSN, and GGSN can count and report the MBMS audience in respective statistical ranges. In practice, a statistical notification message can be added on the Gmb, Gn, and Iu_ps reference points to notify the RNC, SGSN, and GGSN to start the MBMS audience counting function. The statistical notification message carries the reporting frequency, one or more NE IDs where MBMS audience is to be counted, and an MBMS bearer service ID for counting the audience of a specific MBMS user service. A statistical report message is added on the Gmb, Gn, and Iu_ps reference points to report the counted audience data of MBMS. It should be noted that the MBMS user service here refers to a specific channel provided to UEs; the MBMS bearer service refers to the network resource and air interface radio bearer resource allocated for the delivery of the MBMS user service to the core network, radio network and UE. The radio bearer resource may be a PTP dedicated channel or a PTM shared channel. One MBMS user service may be carried on multiple MBMS bearer services. The BM-SC can record the mapping between MBMS user service IDs and MBMS bearer service IDs In practice, the GGSN receives the statistical parameters which may be carried in a statistical notification message sent by the BM-SC or directly set on the GGSN through a configuration file or a network management device. The GGSN determines a statistical range according to the statistical parameters and forwards the statistical parameters to the corresponding lower-level SGSNs according to the determined statistical range. The GGSN also receives the MBMS audience data on lower-level SGSNs from the SGSNs and adds up the MBMS audience of each lower-level SGSN to get the audience data on the GGSN. Then, the GGSN reports the audience data on the GGSN to the BM-SC.

An SGSN receives the statistical parameters which may be carried in a statistical notification message sent by the GGSN or directly set on the SGSN through a configuration file or a network management device. The SGSN determines a statistical range according to the statistical parameters and forwards the statistical parameters to the corresponding lower-level RNCs according to the determined statistical range. The SGSN also receives the MBMS audience data on the lower-level RNCs from the RNCs and adds up the MBMS audience of each lower-level RNC to get the audience data on the SGSN. Then, the SGSN reports the audience data on the SGSN to the GGSN.

An RNC receives the statistical parameters which may be carried in the statistical notification message sent by the SGSN or directly set on the RNC through a configuration file or a network management device. The RNC determines a statistical range according to the statistical parameters. The statistical range includes which MBMS bearer services and which specific areas require audience counting. The RNC triggers a scheduled task according to the statistical parameters, and when the scheduled task is finished, counts the collected quantity of UEs receiving the MBMS data in the counting/re-counting process according to the statistical parameters to get the MBMS audience on the RNC. The RNC may buffer the counting/re-counting result and get the MBMS audience on the RNC according to the buffered result and the statistical parameters. The RNC sends the MBMS audience data within the statistical range to the SGSN.

The BM-SC receives the MBMS audience on GGSNs reported by the GGSNs and adds up the MBMS audience reported by the GGSNs to get the final MBMS audience. The EM-SC presents the final counting result on an interface. An operator or a service provider can adjust the program or ad arrangement according to the MBMS audience counting result.

FIG. 2B illustrates the system architecture for counting MBMS audience according to another embodiment of the invention.

In the embodiment, the statistical analysis NE is a data service platform. The system also includes GGSNs, SGSNs, and RNCs. The GGSNs, SGSNs, and RNCs each can be connected to the data service platform and therefore different MBMS audience data can be obtained in different scenarios.

In practice, a GGSN receives the statistical parameters which may be carried in a statistical notification message sent by the data service platform or directly set on the GGSN through a configuration file or a network management device. The GGSN determines a statistical range according to the statistical parameters and forwards the statistical parameters to the corresponding lower-level SGSNs according to the determined statistical range. The GGSN also receives the MBMS audience on the lower-level SGSNs from the SGSNs and adds up the MBMS audience of each lower-level SGSN to get the audience data on the GGSN. Then, the GGSN reports the audience data on the GGSN to the data service platform.

An SGSN receives the statistical parameters which may be carried in a statistical notification message sent by the GGSN or directly set on the SGSN through a configuration file or a network management device if the statistical range is specific within the service area of one or more SGSNs, or directly sent by the data service platform. The SGSN determines a statistical range according to the statistical parameters and forwards the statistical parameters to the corresponding lower-level RNCs according to the determined statistical range. The SGSN also receives the MBMS audience data on the lower-level RNCs from the RNCs and adds up the MBMS audience of each lower-level RNC to get the audience data on the SGSN. Then, the SGSN reports the audience data on the SGSN to the GGSN or directly to the data service platform.

An RNC receives the statistical parameters which may be carried in a statistical notification message sent by an SGSN, or directly set on the RNC through a configuration file or a network management device if the statistical range is specific within the service area of one or more RNCs, or directly sent by the data service platform. The statistical range includes which MBMS bearer services and which specific areas require audience counting. The RNC triggers a scheduled task according to the statistical parameters and when the scheduled task is finished, counts the collected quantity of UEs receiving MBMS data in the counting/re-counting process according to the statistical parameters to get the MBMS audience on the RNC. The RNC may also buffer the counting/re-counting result and count the MBMS audience on the RNC according to the buffered result and the statistical parameters. The RNC sends the MBMS audience on the RNC to the SGSN or directly to the data service platform.

The data service platform receives the MBMS audience on a lower-level NE reported by the lower-level NE and adds up the MBMS audience reported by lower-level NE to get the final MBMS audience counting result. In some cases, the statistical analysis NE selects first NEs that require audience counting according to preset statistical parameters and adds up the MBMS audience reported by the first NEs to get the final MBMS audience data. The data service platform presents the counting result on an interface. An operator or a service provider can adjust the program or ad arrangement according to the MBMS audience data.

It should be noted that the statistical analysis NE in FIG. 2B is a data service platform, in practice, it may be a BM-SC. In the latter case, the embodiment shown in FIG. 2B is different from that shown in FIG. 2A in that not only the Gmb, Gn, and Iu_ps reference points are provided to connect the GGSN, SGSN, and RNC to the BM-SC, but also new interfaces can be added between the RNC and the BM-SC and between the SGSN and the BM-SC to enable direct communications between the RNC and the BM-SC and between the SGSN and the BM-SC. Thus, the RNC or SGSN can report: the MBMS audience within the statistical range of the RNC or SGSN directly to the BM-SC. The method shown in FIG. 2B requires a new interface between the RNC and the BM-SC and a new interface between the SGSN and the BM-SC. Compared with the method based on the existing interfaces shown in the FIG. 2A, this needs a lot of changes to the existing network, but saves signaling transfer resources.

Figure 3:
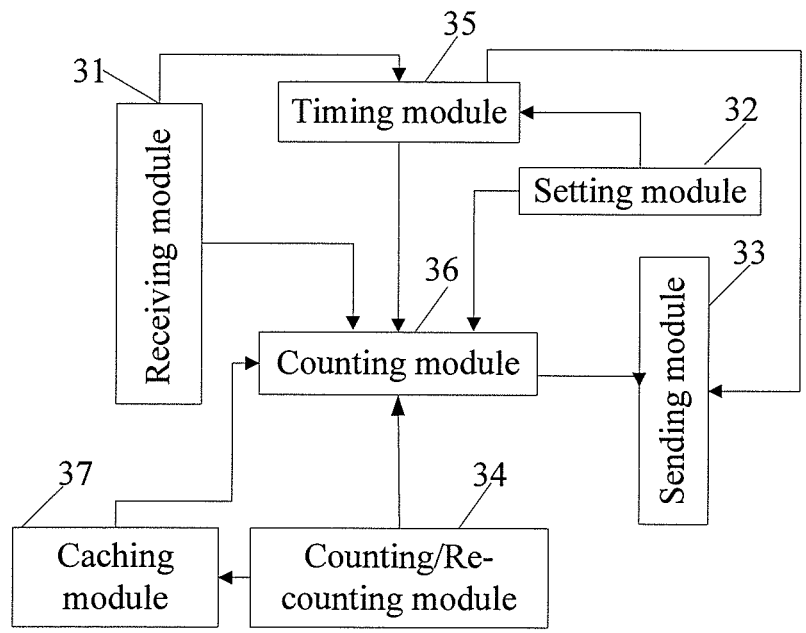
FIG. 3 illustrates a radio network controller (RNC) structure according to an embodiment of the invention.

FIG. 3 illustrates a structure of the RNC in an embodiment of the invention. The RNC includes a receiving module 31, a setting module 32, a sending module 33, a counting/re-counting module 34, a timing module 35, a counting module 36, and a buffering module 37.

The receiving module 31 is configured to receive a statistical notification message sent by a corresponding SGSN or a statistical analysis NE. The receiving module 31 is optional. Because statistical parameters for starting a counting function can be obtained through the setting module 32, it is not necessary to obtain the statistical parameters for starting the counting function by receiving the statistical notification message sent by the corresponding SGSN or the statistical analysis NE.

The setting module 32 is configured to set the statistical parameters required for starting the audience counting function through a configuration file or a network management device. The setting module 32 is also optional.

The statistical parameters received by the receiving module 31 from the statistical notification message or the statistical parameters set by the setting module 32 may include the reporting frequency, MBMS bearer service ID, one or more NE IDs where MBMS audience is to be counted, and one or more cell IDs where MBMS audience is to be counted.

The counting/re-counting module 34 is configured to obtain the quantities of UEs receiving MBMS collected by the RNC in a counting/re-counting process and send the counted quantities of UEs receiving MBMS to the counting module 36.

The timing module 35 is configured to: trigger a scheduled task according to the statistical parameters received by the receiving module or set by the setting module 32, where the statistical parameters include the reporting frequency parameter, and when the scheduled task is finished, instruct the sending module 33 to report the counted MBMS audience data to the corresponding upper-level SGSN or the statistical analysis NE, or instruct the counting module 36 to count the MBMS audience on the RNC when the scheduled task is finished. The timing module 35 is not optional. The counting and reporting of MBMS audience may be triggered by an event and not necessarily by time.

The counting module 36 is configured to: receive the collected quantities of UEs receiving MBMS during the counting/re-counting process sent by the counting/re-counting module 34 and obtain the statistical parameters from the receiving module 31 or the setting module 32, and when the scheduled task started by the timing module 35 is finished, count the audience based on the quantities of UEs receiving MBMS (usually the quantity of UEs receiving each MBMS service in each cell) collected by the counting/re-counting module 34 in the counting/re-counting process according to the statistical parameters. Specifically, the counting module 36 selects the UE quantities corresponding to the MBMS bearer service ID and cell ID and adds up the selected UE quantities to get the MBMS audience in the statistical range.

The sending module 33 is configured to report the MBMS audience counted by the counting module 36 to the corresponding SGSN or statistical analysis NE.

The RNC usually collects the quantity of UEs receiving each MBMS bearer service in each cell. Because the counting/re-counting process usually obtains the quantity of UEs using each MBMS bearer service in a specific cell, one counting/re-counting processing generally counts the quantity of UEs in one cell. If the statistical range covers multiple cells, the result data obtained in a counting/re-counting process must be buffered, so that the RNC can obtain the quantity of UEs receiving the MBMS bearer service in every cell within the statistical range. In some cases, the counting is specific to a time period or a user service channel while the counting/re-counting module 34 counts the audience in real time without saving all history data. Therefore, it is necessary to buffer the counting/re-counting result data. In the above two cases, the buffering module 37 is required. The buffering module 37 may buffer the result data in the form of a file or in a memory space. The result data includes the MBMS bearer service ID, quantity of UEs receiving the MBMS bearer service, counting time, UE ID, RNC ID, and cell ID. After the result data buffered by the buffering module 37 are read, the buffered data is cleared. If the buffered data reaches a certain amount without being read, the buffering module 37 will clear the data periodically. The counting module 36 selects the desired result data according to the statistical parameters from the buffered result data. For example, the counting module 36 may select the corresponding area, counting time, and UE quantity of MBMS bearer service and adds up the selected UE quantities to get the MBMS audience on the RNC. The buffering module 37 is optional because certain counting requirements are not subject to the above two cases. In this case, the result data of the counting/re-counting module 34 does not need to be buffered.

Figure 4:
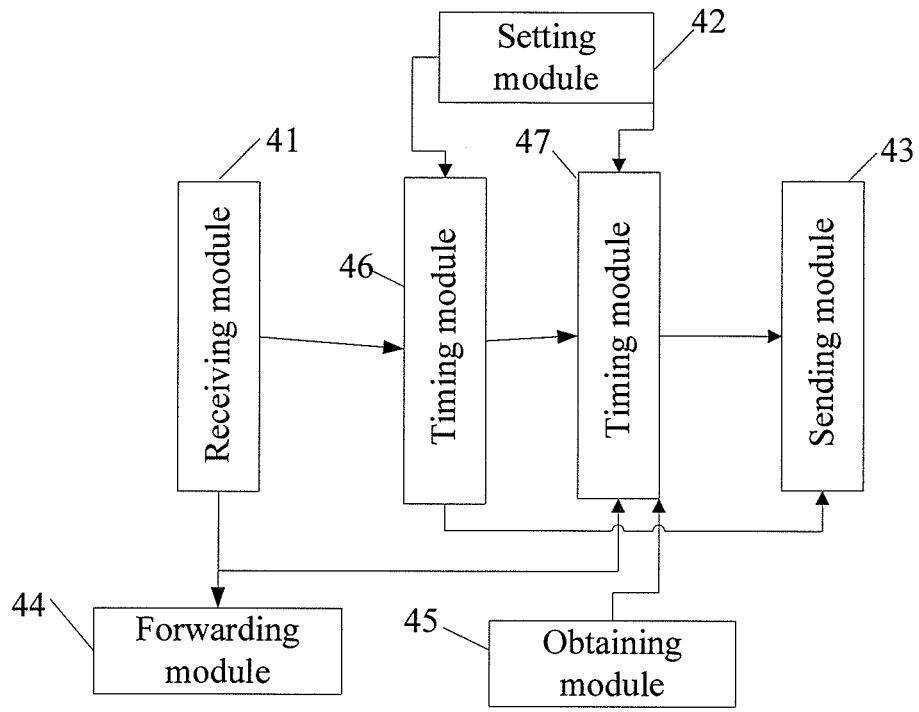
FIG. 4 illustrates a structure of a communication NE according to an embodiment of the invention.

FIG. 4 illustrates a structure of the SGSN or GGSN in an embodiment of the invention. The SGSN or GGSN may include a receiving module 41, a setting module 42, a sending module 43, a forwarding module 44, an obtaining module 45, a timing module 46, and a counting module 47.

The receiving module 41 is configured to receive a statistical notification message sent by a corresponding upper-level NE (GGSN or statistical analysis NE in the case of an SGSN, or statistical analysis NE in the case of a GGSN, where the statistical analysis NE may be a BM-SC), where the statistical notification message carries statistical parameters. The receiving module 41 is optional. The statistical parameters may optionally be set by the setting module 42.

The setting module 42 is configured to set the statistical parameters required for starting the audience counting function through a configuration file or a network management device. The statistical parameters received by the receiving module 41 or set by the setting module 42 may include the reporting frequency, MBMS bearer service ID, one or more NE IDs where MBMS audience is to be counted, and one or more cell IDs where MBMS audience is to be counted. The setting module 42 is optional, because the statistical parameters may be obtained from the statistical notification message received by the receiving module 41.

The sending module 43 is configured to report the MBMS audience counted by the counting module 47 to the corresponding GGSN or statistical analysis NE.

Accordingly, the SGSN or GGSN may further include a forwarding module 44 and an obtaining module 45. The forwarding module 44 is configured to forward the statistical parameters to lower-level NEs. If the statistical parameters are carried in the statistical notification message received by the receiving module 41, the forwarding module 44 forwards the statistical notification message directly to the lower-level NEs; if the statistical parameters are set by the setting module 42, the forwarding module 44 obtains the statistical parameters, encapsulates the statistical parameters into a statistical notification message, and forwards the statistical notification message to the lower-level NEs. The forwarding module 44 is optional.

The obtaining module 45 is configured to receive the MBMS audience on the lower-level NEs reported by the lower-level NEs.

The timing module 46 is configured to trigger a scheduled task according to the statistical parameters. The statistical parameters include the reporting frequency. The timing module 46 triggers the scheduled task according to the reporting frequency and instructs the sending module 43 to send the counting result to the upper-level NE, or triggers the counting module 47 to count the audience when the scheduled task is finished. The timing module 46 is optional. If the statistical notification message does not include the reporting frequency parameter, the timing module 46 is unneeded. The counting module 47 may optionally start counting without a scheduled task, but according to an event (for example, start or end of a program) to add up the MBMS audience of the lower-level NEs obtained by the obtaining module 45, in which case, the timing module 46 is also unneeded.

The counting module 47 is configured to determine a statistical range according to the statistical parameters in the statistical notification message received by the receiving module 41 or the statistical parameters set by the setting module 42. The statistical parameters include the MBMS bearer service ID that requires audience counting and the cell IDs or NE IDs where audience counting is required. According to these parameters, the counting module 47 can determine the MBMS bearer service and the area where audience counting is required. The counting module 47 also starts the counting function according to the scheduled task triggered by the timing module 46 and when the scheduled task is finished, adds up the MBMS audience obtained by the obtaining module 45 from by the lower-level NEs within the specified time to get the MBMS audience on the local NE. Optionally, the counting module 47 does not count the audience according to the scheduled task triggered by the timing module 46, but directly adds up the MBMS audience obtained by the obtaining module 45 from the lower-level NEs according to the MBMS bearer service ID in the statistical notification message, or triggers counting according to an event (for example, start or end of a program).

Figure 5:
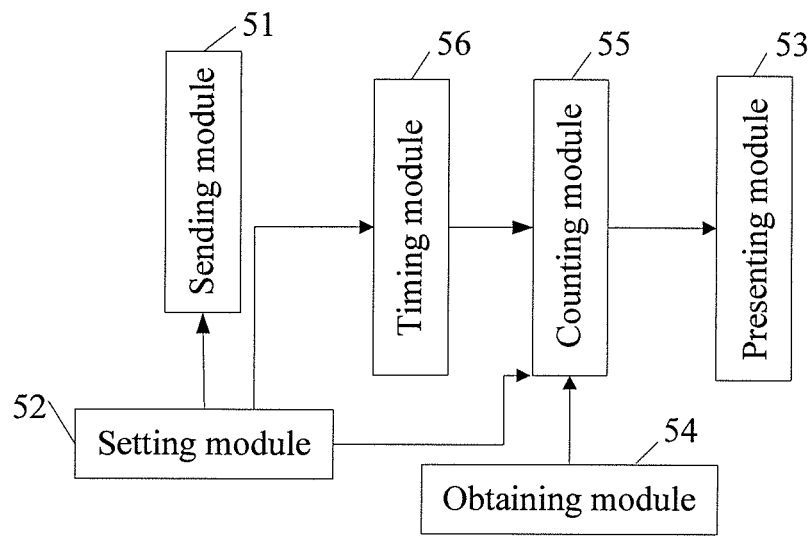
FIG. 5 illustrates a structure of a statistical analysis NE according to an embodiment of the invention.

FIG. 5 illustrates a structure of the statistical analysis NE in an embodiment of the invention. The statistical analysis NE may be a BM-SC or a data service platform and may include a sending module 51 and an obtaining module 54. The sending module 51 is configured to send a statistical notification message to corresponding lower-level NEs, which may be GGSNs, SGSNs, and RNCs; the obtaining module 54 is configured to receive the MBMS audience on the lower-level NEs reported by the lower-level NEs.

The timing module 56 is configured to trigger a scheduled task according to the statistical notification message set by the setting module 52 and trigger the counting module 55 to count the MBMS audience. The counting module 55 is configured to count the MBMS audience according to the statistical parameters in the statistical notification message set by the setting module 52 when the scheduled task started by the timing module is finished.

Accordingly, the BM-SC may further include a setting module 52 and a presenting module 53. The setting module 52 is configured to set the statistical parameters in the statistical notification message. The statistical parameters in the statistical notification message may include the reporting frequency, MBMS bearer service ID, NE ID where MBMS audience is to be counted, and cell ID where MBMS audience is to be counted. The NE where MBMS audience is to be counted may be the RNC, SGSN, or GGSN. When one MBMS user service uses multiple MBMS bearer services, the setting module 52 provides flexible parameter setting and result presenting. For example, an administrator may set the MBMS user service ID via the setting module 52. Because the MBMS user service ID is more friendly to the administrator, the setting module 52 can convert the MBMS user service ID to the corresponding MBMS bearer service ID and encapsulate the MBMS bearer service ID in the statistical notification message. If the system administrator is only concerned about the audience of certain services in a certain area, the administrator can set a specific geographic area, such as a city or a street. When setting the statistical notification message, the setting module 52 can convert the specific geographic area to the IDs of the corresponding SGSNs, GGSNs, RNCs, and cells and incorporate the IDs in the statistical notification message. The statistical notification message is sent to the corresponding NEs level by level according to these IDs to activate the corresponding NEs to count the MBMS audience. The above process can be implemented by storing a mapping relation between geographic areas and NEs in the setting module 52. The presenting module 53 is configured to present the MBMS audience counted by the counting module 55. Specifically, the presenting module 53 converts multiple MBMS bearer services to the corresponding MBMS user services and presents the MBMS user services to the administrator. The presenting module 53 also converts specific NE IDs or cell IDs to specific geographic areas and presents the geographic areas. This can also be implemented by storing a mapping relation between the NE IDs or cell IDs and the geographic areas in the presenting module 53.

Figure 6:
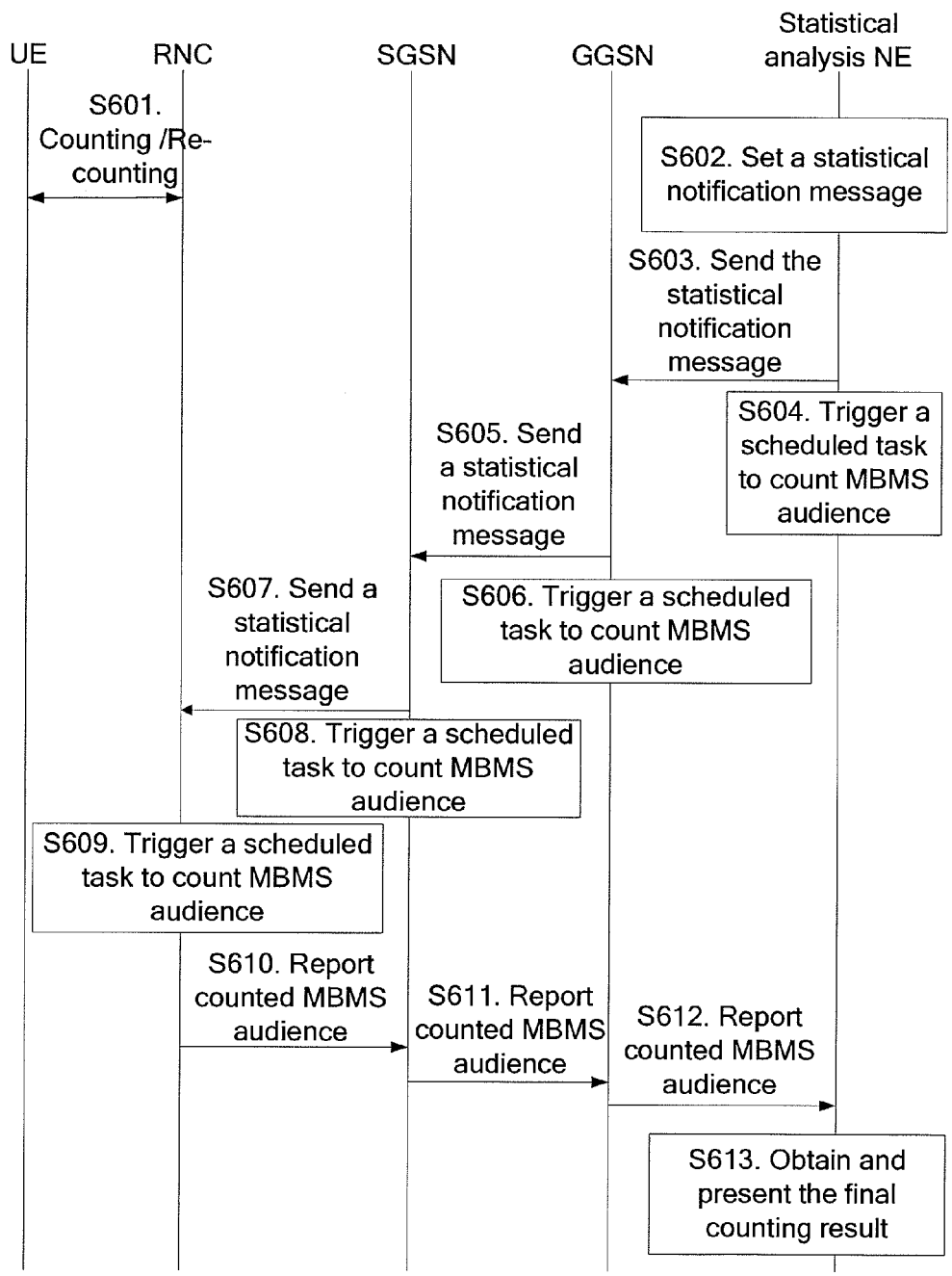
FIG. 6 is a flowchart of a method for counting MBMS audience according to an embodiment of the invention.

FIG. 6 is a flowchart of MBMS audience counting in an embodiment of the invention, including the following steps:

S601. The RNC carries out counting/re-counting interactions with multiple UEs. The RNC of a UTRAN controls the PTP/PTM switching of an MBMS bearer service through counting/re-counting and collects the quantity of UEs receiving the MBMS bearer service in each cell.

S602. The statistical analysis NE sets parameters of a statistical notification message.

The parameters in a statistical notification message may include the reporting frequency, MBMS bearer service ID, and NE ID or cell ID where MBMS audience is to be counted. According to the 3GPP specifications, the coverage of MBMS is based on areas and the minimum area is a cell. Therefore, the statistical notification message can include parameters to indicate that one or more SGSNs, GGSNs, RNCs, or cells should be activated to count the MBMS audience. For example, if the administrator is only concerned about the audience of certain services in a certain area, when the statistical notification message is set, the specific area is converted to the ID of the corresponding SGSN, GGSN, RNC or cell. By sending the statistical notification message level by level to the corresponding NE according to the ID, the corresponding NE is activated to count the MBMS audience.

S603. The statistical analysis NE sends the statistical notification message to GGSNs.

The BM-SC determines a statistical range according to the NE ID, cell ID, or MBMS bearer service ID in the statistical notification message and sends the statistical notification message to the GGSNs in the statistical range.

S604. The statistical analysis NE triggers a scheduled task to count the audience of MBMS.

The statistical analysis NE may trigger the scheduled task according to the statistical notification parameters to count the MBMS audience reported by the corresponding GGSNs. This step is optional. The purpose of the scheduled task is to trigger the statistical analysis NE to add up the audience reported by the lower-level NEs and report the counting result at predetermined time. Timed triggering is a preferred trigger condition, but other trigger conditions, such as an event, are also applicable.

S605. The GGSNs send the statistical notification message to SGSNs.

A GGSN receives the statistical notification message, reads the statistical parameters, and determines a statistical range according to the statistical parameters. The GGSN sends the statistical notification message to all SGSNs in the statistical range, where the statistical notification message carries the statistical parameters.

S606. The GGSNs trigger scheduled tasks to count the MBMS audience.

A GGSN reads the statistical parameters in the statistical notification message and may trigger a scheduled task according to the reporting frequency in the statistical parameters to count the MBMS audience reported by the corresponding SGSNs. This step is optional. The purpose of the scheduled task is to trigger the GGSN to add up the audience reported by the SGSNs and report the counting result at predetermined time. Timed triggering is a preferred trigger condition, but other trigger conditions used by those skilled in the art, such as an event, are also applicable.

S607. The SGSNs send the statistical notification message to RNCs.

An SGSN determines a statistical range according to the statistical parameters carried in the statistical notification message and sends the statistical notification message to RNCs in the statistical range.

S608. The SGSNs trigger scheduled tasks to count the MBMS audience.

An SGSN reads the statistical parameters in the statistical notification message and may trigger a scheduled task according to the reporting frequency in the statistical parameters to count the MBMS audience reported by the corresponding RNCs. This step is optional. The purpose of the scheduled task is to trigger the SGSN to add up the audience reported by the RNCs and report the counting result at predetermined time. Timed triggering is a preferred trigger condition, but other trigger conditions used by those skilled in the art, such as an event, are also applicable.

S609. The RNCs trigger scheduled tasks to count the MBMS audience.

After an RNC receives the statistical notification message, the RNC triggers a scheduled task according to the statistical parameters, such as the reporting frequency, in the statistical notification message. When the scheduled task is finished, the RNC counts the MBMS audience based on the quantities of UEs receiving MBMS (generally the quantity of UEs receiving each MBMS service in each cell) collected in the counting/re-counting processes according to the statistical parameters. The RNC determines a statistical range according to the statistical parameters. The statistical range may be determined according to the MBMS bearer service ID and cell ID in the statistical parameters. Then the RNC selects the UE quantities corresponding to the MBMS bearer service ID and cell ID and adds up the selected UE quantities to get the MBMS audience on the RNC. Generally, the counting/re-counting process obtains the quantity of UEs using each MBMS bearer service in one specific cell. If the statistical range relates to multiple cells, the RNC must buffer the result data obtained in each counting/re-counting process to get all quantities of UEs using the MBMS bearer service in all cells in the statistical range. In some cases, the counting may be specific to a time period or a user service channel, but the counting/re-counting process counts the audience in real time without saving all history data. Therefore the RNC must also buffer the result data of the counting/re-counting process. The buffering step is optional, because other counting requirements are not subject to the above two cases. The result data may include the MBMS bearer service ID, quantity of UEs using the MBMS bearer service, counting time, UE ID, RNC ID, and cell ID. With the data, the RNC is able to count and record the historical audience. The RNC can select the required result data from the buffer according to the statistical parameters, for example, selecting the corresponding area, counting time, and UE quantity, and add up the selected UE quantities to get the MBMS audience on the RNC in the statistical range.

S610. The RNCs report the MBMS audience on the RNCs to the corresponding SGSNs.

When the scheduled task is finished, an RNC reports the MBMS audience on the RNC to the corresponding SGSN.

S611. The SGSNs report the counted MBMS audience to the corresponding GGSNs via a statistical report message.

When the scheduled task is finished, an SGSN adds up the MBMS audience reported by one or more RNCs to get the audience on the SGSN and reports the audience on the SGSN to the corresponding GGSN. Here, the timed triggering is also optional. Other trigger conditions known by those skilled in the art, such as an event, are also applicable.

S612. The GGSNs report the counted MBMS audience to the statistical analysis NE via a statistical report message.

When the scheduled task is finished, a GGSN adds up the MBMS audience reported by one or more SGSNs to get the audience on the GGSN and reports the audience on the GGSN to the statistical analysis NE. Here, the timed triggering is also optional. Other trigger conditions known by those skilled in the art, such as an event, are also applicable.

S613. The statistical analysis NE obtains and presents the final audience counting result.

When the scheduled task is finished, the statistical analysis NE adds up the audience reported by the GGSNs to get the final audience counting result and presents the counted audience of an MBMS bearer service or an MBMS user service to the administrator. Here, the timed triggering is also optional. Other trigger conditions known by those skilled in the art, such as an event, are also applicable.

The statistical analysis NE shown in FIG. 6 may be a BM-SC or a data service platform. In the case of a BM-SC, the new statistical notification message and statistical report message can be defined on the existing interface between BM-SC and GGSN, the interface between GGSN and SGSN, and the interface between SGSN and RNC.

Figure 7:
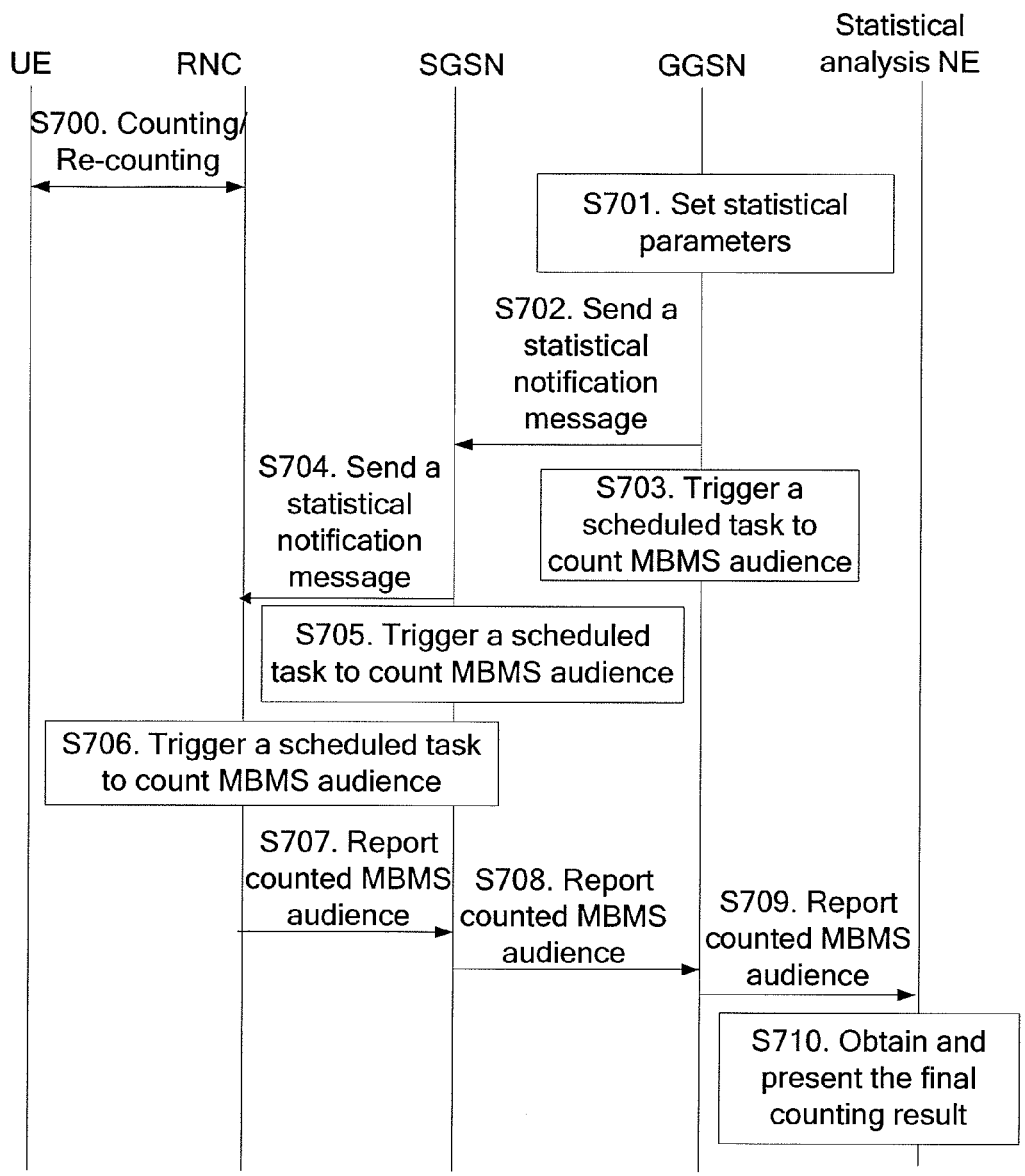
FIG. 7 is another flowchart of a method for counting MBMS audience according to an embodiment of the invention.

If the area that requires audience counting is specific and known within the coverage of one or more GGSNs, the required statistical parameters can be set on the one or more GGSNs directly and the counting results of the GGSNs are sent to the statistical analysis NE for statistical analysis. The statistical analysis NE will proceed with other operations according to the analysis result. The statistical analysis NE is a data service platform or a BM-SC. In this case, the counting process, as shown in FIG. 7, includes the following steps:

S700. An RNC carries out counting/re-counting interactions with multiple UEs. The RNC of a UTRAN controls the PTP/PTM switching of an MBMS bearer service through counting/re-counting and collects the quantity of UEs receiving the MBMS bearer service in each cell.

S701. The GGSN set statistical parameters.

The statistical parameters required for starting the audience counting function are set through a configuration file or a network management device. The statistical parameters include the reporting frequency, MBMS bearer service ID, one or more NE IDs where MBMS audience is to be counted, or one or more cell IDs where MBMS audience is to be counted. According to 3GPP specifications, the coverage of MBMS is based on areas and the minimum area is a cell. Therefore, the statistical parameters may indicate that one or more SGSNs and RNCs are activated to count the MBMS audience.

S702. The GGSNs send the statistical notification message to SGSNs.

The statistical notification message carries the statistical parameters set in step S701 required for starting the audience counting function. A GGSN receives the statistical notification message, reads the statistical parameters, and sends the statistical notification message to corresponding SGSNs.

S703. The GGSNs trigger scheduled tasks to count the MBMS audience.

A GGSN triggers a scheduled task according to the statistical parameters set in step S701 required for starting the audience counting function and adds up the MBMS audience reported by the corresponding SGSNs. This step is optional. The purpose of the scheduled task is to trigger the GGSN to add up the audience reported by the SGSNs and report the counting result at predetermined time. Timed triggering is a preferred trigger condition, but other trigger conditions used by those skilled in the art, such as an event, are also applicable.

Steps S704 to S710 are the same as steps S607 to S613 and will not be described here again.

In the embodiment shown in FIG. 7, because the statistical parameters are set on the GGSN, it is unnecessary to set a statistical notification message on the statistical analysis NE. The signaling transfer of the statistical notification message between the statistical analysis NE and the GGSNs is spared and thus network resources are saved.

Figure 8:
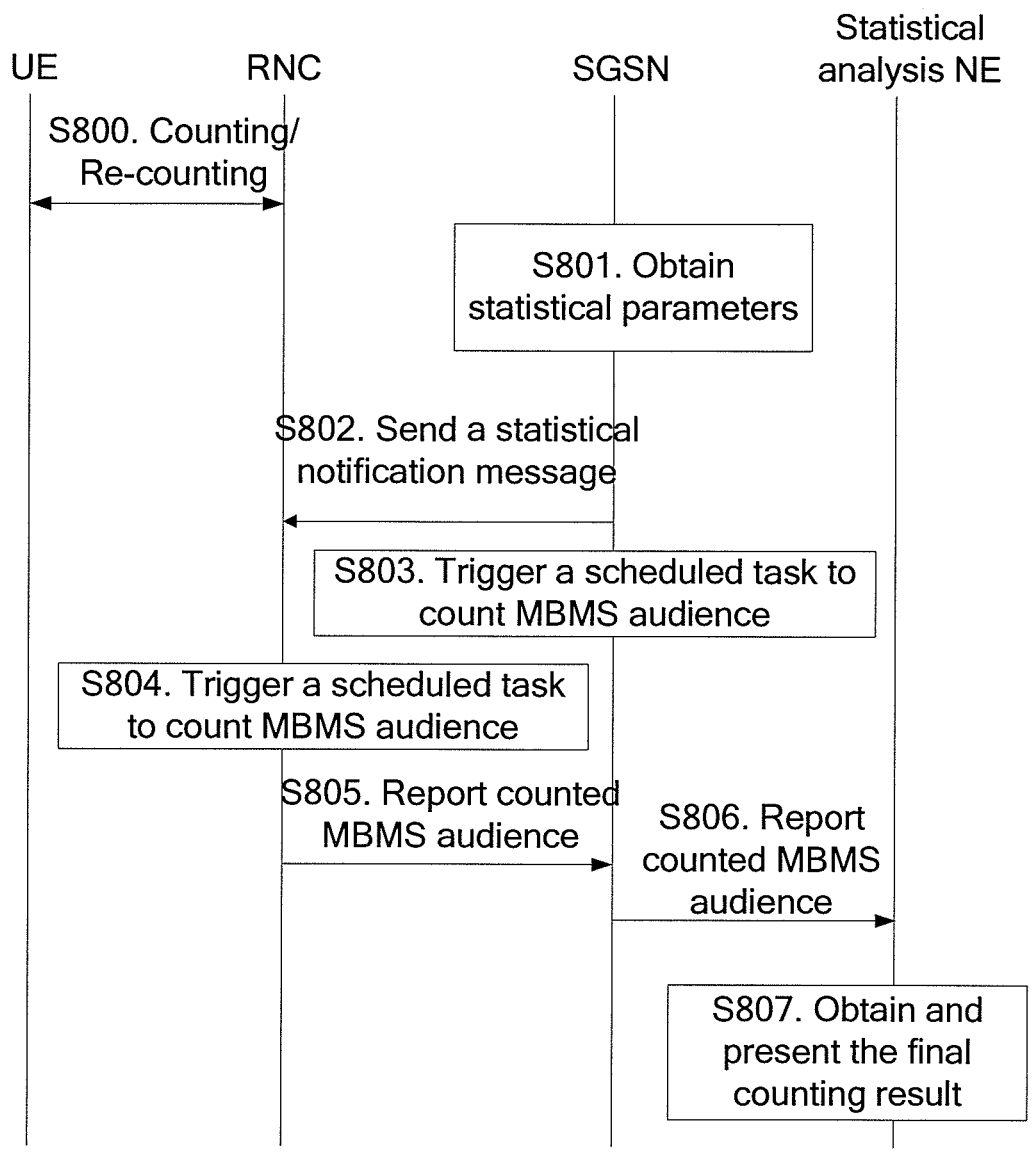
FIG. 8 is another flowchart of a method for counting MBMS audience according to an embodiment of the invention.

If the area that requires audience counting is specific and known within the coverage of one or more SGSNs, the required statistical parameters can be set on the one or more SGSNs directly or sent to the SGSNs via a statistical notification message, and the counting results of the SGSNs are sent to the BM-SC or data service platform or an analyzer for statistical analysis. The BM-SC or data service platform or analyzer will proceed with other operations according to the analysis result. Therefore, the signaling transfer of the statistical notification message between the statistical analysis NE, the GGSN, and the SGSN is spared. In this case, the counting process, as shown in FIG. 8, includes the following steps:

S800. An RNC carries out counting/re-counting interactions with multiple UEs. The RNC of a UTRAN controls the PTP/PTM switching of an MBMS bearer service through counting/re-counting and collects the quantities of UEs receiving the MBMS bearer service.

S801. The SGSN obtain statistical parameters.

The statistical parameters are obtained in two approaches. One is to set the statistical parameters required for starting the audience counting function through a configuration file or a network management device. The other approach is that the statistical analysis NE sends a statistical notification message to the SGSN via a network interface, where the statistical notification message carries the statistical parameters. Here, the statistical analysis NE may be a BM-SC or a data service platform. The statistical parameters may include the reporting frequency, MBMS bearer service ID, one or more NE IDs where MBMS audience is to be counted, or one or more cell IDs where MBMS audience is to be counted. According to 3GPP specifications, the coverage of MBMS is based on areas and the minimum area is a cell. The statistical parameters indicate that one or more SGSNs, GGSNs, RNCs, or cells should be activated to count MBMS audience.

Steps S802 to S805 are the same as steps S607 to S610 and will not be described here again.

S806. The SGSN reports the counted MBMS audience to the statistical analysis NE.

This step requires a new interface between the SGSN and the statistical analysis NE.

S807. The statistical analysis NE obtains and presents the final audience counting result.

When the scheduled task is finished, the statistical analysis NE adds up the audience reported by the GGSNs to get the final audience counting result and presents the counted audience of an MBMS bearer service or an MBMS user service to the administrator. Here, the timed triggering is also optional. Other trigger conditions known by those skilled in the art, such as an event, are also applicable.

Figure 9:
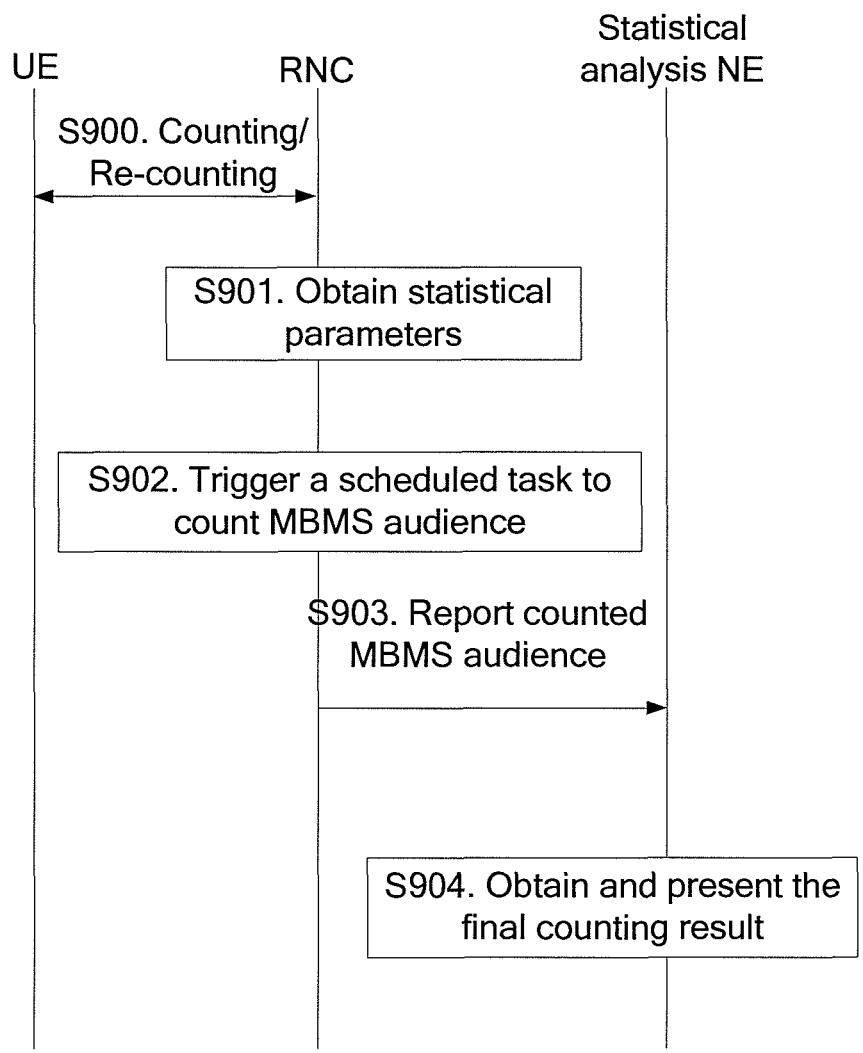
FIG. 9 is another flowchart of a method for counting MBMS audience according to an embodiment of the invention.

If the area that requires audience counting is specific and known within the coverage of one or more RNCs, the required statistical parameters can be set on the one or more RNCs directly or sent to the RNCs via a statistical notification message, and the counting results of the RNCs are sent to the statistical analysis NE for statistical analysis. The statistical analysis NE will proceed with other operations according to the analysis result. Thus, the signaling transfer of the statistical notification message between the BM-SC, the GGSN, the SGSN, and the RNC is spared and therefore signaling resources of the network are saved. In this case, the counting process, as shown in FIG. 9, includes the following steps:

S900. An RNC carries out counting/re-counting interactions with multiple UEs. The RNC of a UTRAN controls the PTP/PTM switching of an MBMS bearer service through counting/re-counting and collects the quantities of UEs receiving the MBMS bearer service.

S901. The RNC set statistical parameters.

The statistical parameters are obtained in two approaches. One is to set the statistical parameters required for starting the audience counting function through a configuration file or a network management device. The other approach is that the statistical analysis NE sends a statistical notification message to the RNC via a network interface, where the statistical notification message carries the statistical parameters. The statistical parameters may include the reporting frequency, MBMS bearer service ID, one or more NE IDs where MBMS audience is to be counted, or one or more cell IDs where MBMS audience is to be counted. According to 3GPP specifications, the coverage of MBMS is based on areas and the minimum area is a cell. The statistical parameters indicate that one or more RNCs should be activated to count the MBMS audience.

S902. The RNC trigger scheduled tasks to count the MBMS audience.

An RNC triggers a scheduled task according to the statistical parameters, such as the reporting frequency. When the scheduled task is finished, the RNC counts the MBMS audience based on the quantities of UEs receiving MBMS (generally the quantity of UEs receiving each MBMS service in each cell) collected in the counting/re-counting processes according to the statistical parameters. The RNC determines a statistical range according to the statistical parameters. The statistical range may be determined according to the MBMS bearer service ID and cell ID in the statistical parameters. Then the RNC selects the UE quantities corresponding to the MBMS bearer service ID and cell ID and adds up the selected UE quantities to get the MBMS audience on the RNC. Generally, the counting/re-counting process obtains the quantity of UEs using each MBMS bearer service in one specific cell. If the statistical range relates to multiple cells or all cells, the RNC must buffer the result data obtained in each counting/re-counting process to get all quantities of UEs using the MBMS bearer service in all cells in the statistical range. In some cases, the counting may be specific to a time period or a user service channel, but the counting/re-counting process counts the audience in real time without saving all history data. Therefore the RNC must also buffer the result data of the counting/re-counting processes. The buffering step is optional because other counting requirements are not subject to the above two cases. The result data may include the MBMS bearer service ID, quantity of UEs using the MBMS bearer service, counting time, UE ID, RNC ID, and cell ID. With the data, the RNC is able to count and record the historical audience. The RNC can select the required result data from the buffer according to the statistical parameters, for example, selecting the corresponding area, counting time, and UE quantity, and add up the selected UE quantities to get the MBMS audience on the RNC in the statistical range.

Optionally, the RNC does not determine a statistical range according to the statistical parameters, but obtains the quantity of UEs receiving each MBMS service in each cell collected in the counting/re-counting process and adds up the obtained UE quantities. The counting result so obtained is the audience of each MBMS service in the coverage of the RNC instead of the audience of a specific cell or an MBMS service.

S903. The RNC reports the counted MBMS audience on the RNC to the statistical analysis NE.

When the scheduled task is finished, the RNC reports the counted MBMS audience to the statistical analysis NE. If the statistical analysis NE is a BM-SC, the RNC can report the counted MBMS audience in a statistical report message to the BM-SC via an SGSN and a GGSN, or the RNC may report the MBMS audience on the RNC to the BM-SC via a new network interface between the RNC and the BM-SC. If the statistical analysis NE is a data service platform, the RNC can report the counted MBMS audience directly to the data service platform.

The MBMS audience on the RNC in step S902 may be the audience of MBMS in the statistical range or the audience of each MBMS service in the coverage of the RNC.

S904. The statistical analysis NE obtains and presents the final audience counting result.

The statistical analysis NE adds up the audience on each RNC reported by each RNC to get the final audience counting result, and presents the counted audience of the MBMS bearer service or MBMS user service to the administrator. If the audience on an RNC reported by the RNC is the audience of MBMS in the statistical range, the statistical analysis NE adds up the audience reported by the RNCs directly to get the final MBMS audience data. If the RNC reports the audience of each MBMS service in its coverage, the statistical analysis NE may select the MBMS audience reported by the corresponding RNCs according to the setting of the administrator (which specifies the NE IDs and MBMS service IDs that require audience counting) to get the final MBMS audience.

The statistical analysis NE analyzes the audience counting result and may adjust the program content and ad arrangement according to the analysis.

Those skilled in the art understand that all or part of the steps in the methods of the embodiments of the invention can be implemented by hardware under the instruction of a program. The program may be stored in a computer readable storage medium and when the program runs, the steps in the methods of the embodiments of the invention are executed. The storage medium may be any medium that can store program codes, such as a read only memory (ROM), a random access memory (RAM), a magnetic disc, or a compact disk-read only memory (CD-ROM).

To sum up, according to the embodiments of the invention, a statistical notification message is sent by the BM-SC or data service platform, or statistical parameters are set on a core NE and sent to a corresponding NE; and the corresponding NE counts the audience of MBMS on the local NE. This is a simple but effective method for counting MBMS audience and a new method for counting MBMS audience in existing MBMS multicast service mode, and also a feasible method for counting MBMS audience in MBMS enhanced broadcast service mode.

Although the technical solution of the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall within the scope of protection defined by the claims or their equivalents.

What is claimed is:

1. A method for counting audience of multimedia broadcast/multicast service (MBMS), the method comprising:
   receiving, by a gateway general packet radio service (GPRS) support node (GGSN), statistical parameters and determining a statistical range according to the statistical parameters;
   sending, by the GGSN, the statistical parameters to corresponding serving GPRS support nodes (SGSNs) according to the statistical range;
   obtaining, by the corresponding SGSNs, an MBMS audience on the corresponding SGSNs and reporting the MBMS audience on the SGSNs to the GGSN; and
   adding up, by the GGSN, the MBMS audience reported by the corresponding SGSNs to get the MBMS audience on the GGSN.

2. The method of claim 1, further comprising:
   receiving, by the GGSN a statistical notification message sent by a statistical analysis network element (NE), wherein the statistical notification message carries the statistical parameters; or
   setting the statistical parameters on the GGSN through a configuration file or a network management device.

3. The method of claim 2, wherein the statistical parameters comprise: reporting frequency, MBMS bearer service ID, and at least one of NE ID or cell ID where MBMS audience counting is required.

4. The method of claim 3, wherein determining the statistical range according to the statistical parameters comprises:
   determining an MBMS bearer service requiring audience counting according to an MBMS bearer service ID; and
   determining an NE or a cell requiring audience counting according to at least one of an NE ID or a cell ID where MBMS audience counting is required.

5. The method of claim 1, further comprising:
   triggering, by the SGSNs, a scheduled task according to the statistical parameters; and
   adding up, by the SGSNs, the audience reported by corresponding RNCs to get the audience on the SGSNs when the scheduled task is finished.

6. A system for counting audience of multimedia broadcast/multicast service (MBMS), the system comprising:
   a gateway general packet radio service (GPRS) support node (GGSN), configured to obtain an MBMS audience on the GGSN and report the MBMS audience on the GGSN to a statistical analysis network element (NE);
   the statistical analysis NE configured to receive the MBMS audience on the GGSN reported by the GGSN and collect statistics to get an MBMS audience counting result
   and the system further comprises serving GPRS support nodes (SGSNs) and radio network controllers (RNCs), wherein:
   the RNCs are configured to count the MBMS audience and report the counted MBMS audience to the SGSNs;
   the SGSNs are configured to receive the MBMS audience reported by the RNCs, add up the MBMS audience reported by the RNCs to get an MBMS audience on the SGSNs, and report the MBMS audience on the SGSNs to the GGSN; and
   the GGSN is configured to receive the MBMS audience reported by the SGSNs and add up the MBMS audience reported by the SGSNs to get an MBMS audience on the GGSN.

7. A method for counting audience of multimedia broadcast/multicast service (MBMS), the method comprising:
   receiving, by a serving general packet radio service (GPRS) support node (SGSN), statistical parameters and determining a statistical range according to the statistical parameters;
   sending, by the SGSN, the statistical parameters to corresponding radio network controllers (RNCs) according to the statistical range;
   obtaining, by the corresponding RNCs, an MBMS audience on the corresponding RNCs and reporting the MBMS audience on the RNCs to the SGSN; and
   adding up, by the SGSN, the audience reported by the corresponding RNCs to get the MBMS audience on the SGSN.

\* \* \* \* \*